HIGH SPEED TELEGRAPHY

Filed Nov. 7, 1942 3 Sheets-Sheet 1

INVENTORS: D. W. FARNSWORTH
J. C. STEINBERG
BY R. C. Terry
ATTORNEY

HIGH SPEED TELEGRAPHY

Filed Nov. 7, 1942 3 Sheets-Sheet 2

INVENTORS: D. W. FARNSWORTH
J. C. STEINBERG
BY
R. C. Terry
ATTORNEY

Sept. 24, 1963 D. W. FARNSWORTH ETAL 3,105,111

HIGH SPEED TELEGRAPHY

Filed Nov. 7, 1942 3 Sheets-Sheet 3

INVENTORS: D. W. FARNSWORTH
J. C. STEINBERG

BY R. C. Terry

ATTORNEY

United States Patent Office 3,105,111
Patented Sept. 24, 1963

3,105,111
HIGH SPEED TELEGRAPHY

Daniel W. Farnsworth, Little Falls, and John C. Steinberg, Short Hills, N.J., assignors to Bell Telephone Laboratories, Incorporated, New York, N.Y., a corporation of New York Filed Nov. 7, 1942, Ser. No. 464,848
20 Claims. (Cl. 178—22)

This invention relates to telegraphic transmission and reception of messages and particularly to ultra-high speed telegraphy which contemplates the transmission in a fraction of a second of messages of such length that at ordinary transmitting speed would require from 40 to 60 seconds for their transmission.

The invention has particular importance in the field of radio transmission although its utility is not restricted to this field and it may have important application in the field of wire or cable telegraphy.

From the standpoint of radio communication an object of the invention is to transmit a message of sufficient length to express a complete thought in so short a time interval as to minimize the possibility of interception and also to minimize the possibility of locating the transmitter by the use of direction finding apparatus.

Another object of the invention is to store a message on a recording medium at normal message transmitting speed and to transmit the message from the storing medium at substantially one hundred times the recording speed.

Another object of the invention is to bring the storing medium up to the transmitting speed, running it repetitiously past the reproducing means, and to reproduce and transmit the message once from beginning to end automatically although the storing medium continues to travel at the transmitting speed, repetitiously carrying the message past the reproducing means after the single transmission of the message.

Another object of the invention is to receive and record a message magnetically at ultra-high speed on a magnetizable storing medium without bias.

Another object of the invention is to amplify signals received and to be recorded at high speed in a manner which is highly discriminatory against static, multiple path reception and signal fading.

Another object of the invention is to vary the gain of an amplifier associated with a signal reproducer conjointly, through coupled control, with the changing of the speed of a signal storing medium, said change in amplifier gain being in inverse relation, although not necessarily inversely proportional relation, to the change in speed, so as to compensate for changes in signal level resulting from changes in the frequency of recorded signals due to recording at one speed and reproducing at a vastly different speed.

Another object of the invention is to control a two-speed driving mechanism and a multiple position switching mechanism by means of a single control.

A feature of the invention is the erasure of stored signals from a magnetic storing medium by means of a high frequency alternating current which substantially demagnetizes the storing medium.

A feature of the invention is the on and off modulation of a low frequency tone for the recording of signals to be transmitted and the on and off modulation by received signals of a tone, the frequency of which bears substantially the same relation to the low frequency tone as the high speed of the storing medium bears to the low speed thereof, so that when the recording medium is run at the low speed for the reading of received signals the reproduced tone shall be at substantially the same frequency as said low frequency tone.

A feature of the invention is an amplifier for received signals which has a sharply limiting characteristic.

In the preferred embodiment of the invention the recording medium is a magnetizable tape carried by the flange of a rotatable wheel in such position that the tape extends beyond the edge of the flange. The recording magnet is mounted so that its pole faces engage the inner and outer surfaces of the magnetizable tape. The wheel is driven from a motor through a two-speed clutch mechanism, the shifter lever of which is shiftable from a neutral position to either of two operative positions for imparting high or low speed to the wheel and is linked through a yielding connection to the operating shaft of a multiple bank five-point switch the center contact of which represents the idle condition. Upon operation of the switch to the first point on either side of the neutral position low or high speed rotation is imparted to the magnetic tape wheel and appropriate switching operations are performed, and when the switch is advanced to the second contact on each side of the neutral contact other switching operations are performed without change in the magnetic tape speed resulting from operation of the switch to the first step on either side of the neutral position. The two switching positions on the low speed side represent recording of a message for transmission and reading of a received message. The two switching positions on the high speed side represent message transmission and message reception.

In the recording of a message to be transmitted a 60-cycle alternating current tone is keyed according to the telegraph signals and the keyed tone is impressed upon the recording magnet together with a biasing current to record the keyed tone on the magnetic tape, the biasing current providing for recording in the straight line portion of the magnetization curve to minimize distortion. At this time the magnetic tape is running at low speed with the control switch set in the low speed recording position. At the same time that the 60-cycle tone is keyed another tone of suitable audibility, which may be of the order of 1,000 cycles, is also keyed and this keyed tone is impressed on a sound reproducing device such as a headphone set for enabling an operator to monitor the recording of the signals. An indicator lamp, the operating circuit of which is cam controlled from the magnetic tape wheel, signals the operator when to begin recording and when the limit of the capacity of the tape is reached and the cam is so oriented on the shaft of the magnetic tape wheel that the joint in the tape does not pass the recording magnet during the recording interval. A scale and pointer device is also provided to indicate progressively rotation of the tape wheel through a cycle of one revolution. If the operator wishes to monitor the signals after recording has been completed and before transmission, the control switch is shifted to the other low speed position which is the signal reading position. With the control switch in this position, electrical circuit connections are made whereby the recording magnet, which now serves as a reproducing magnet, impresses the signals on an amplifier from which the amplified signals are introduced into a rectifier and the rectified signals key the signal reading tone which, as previously stated, may be 1,000 cycles, and this keyed tone is impressed upon the headphones.

When the stored message is to be transmitted the control switch is operated to the high speed sending position. This causes the magnetic tape wheel to be driven at high speed and prepares for connection of the amplifier to a tone keyer associated with a radio transmitter. The switching to the high speed sending position does not effect the transmission of the signals, however. In order for message transmission to be initiated the operator depresses a push-button which prepares a circuit for the energization of a relay, the function of which, when operated, is to connect the amplifier to the radio transmitter. A cam associated with the shaft of the magnetic tape wheel completes the circuit of the relay, which effects the connection of the amplifier to the radio transmitter and also prepares a circuit for energizing a second relay. The cam performs this operation just before the beginning of the message reaches the reproducing magnet. The relay which connects the amplifier to the radio transmitter completes a holding circuit for itself through the push-button switch, which must be held closed. As the beginning of the message again approaches the reproducing magnet a cam operated switch completes the circuit of the second relay, which releases the first relay and remains held until the push-button is released, so that the message is transmitted but once although the magnetic tape wheel continues to rotate at high speed and although the operator continues to hold the push-button depressed.

For the reception of signals the control switch is operated to the high speed receiving position, which sets the magnetic tape wheel in continuous rotation at the higher of its two speeds. The switching mechanism also conditions the electrical system for the application of received signals to the recording magnet. Signals are received on a radio receiver, are rectified in the detector of that receiver, and are amplified to a suitable level to produce impulses corresponding to the telegraph signals. These impulses are employed to key an alternating current tone having a frequency of 6,000 cycles per second. The tone as keyed by the rectified impulses is impressed on the recording magnet and is thus recorded on the magnetizable tape. The full message is recorded in one revolution of the tape wheel without overlapping of the beginning and end of the message because the message was confined to less than a full revolution of the tape in the transmitter. In starting the tape wheel in preparation for reception of a message there is no provision for phasing the tape wheel with the tape wheel of the transmitter, from the standpoint of the joints in the two tapes, so that recording of a received message may begin at any random point on the tape and the joint is likely to come within the recorded portion of the tape. If there is little or no gap between the ends of the tape at the joint, the intelligibility of the message at this point will not be materially impaired.

For reading the received message the control switch is operated through the neutral position to the low speed message reading position. This establishes the same condition of the apparatus as that previously described for monitoring of a recorded message. The 6,000-cycle tone recorded on the tape when reproduced at the low speed is substantially $\frac{1}{100}$ of the high speed, has a frequency of substantially 60 cycles per second which corresponds with the low speed message recording frequency, and the reproduced signals are amplified, rectified and employed for keying the 1,000-cycle tone which is impressed on the headphone.

The erasure of signals from the magnetic tape, whether they were recorded at low speed by means of a 60-cycle tone or at high speed by means of a 6,000-cycle tone, is accomplished by adjusting the control switch to the high speed receiving position. A push-button is then depressed which causes to be impressed upon the recording magnet a high frequency alternating current which in the preferred embodiment of the invention is of the order of 40,000 cycles per second. The effect of this high frequency alternating current is to demagnetize the tape completely, thus removing all traces of the recorded message.

For a complete understanding of the invention reference may be had to the following detailed description to be interpreted in the light of the accompanying drawings wherein.

Figure 2:
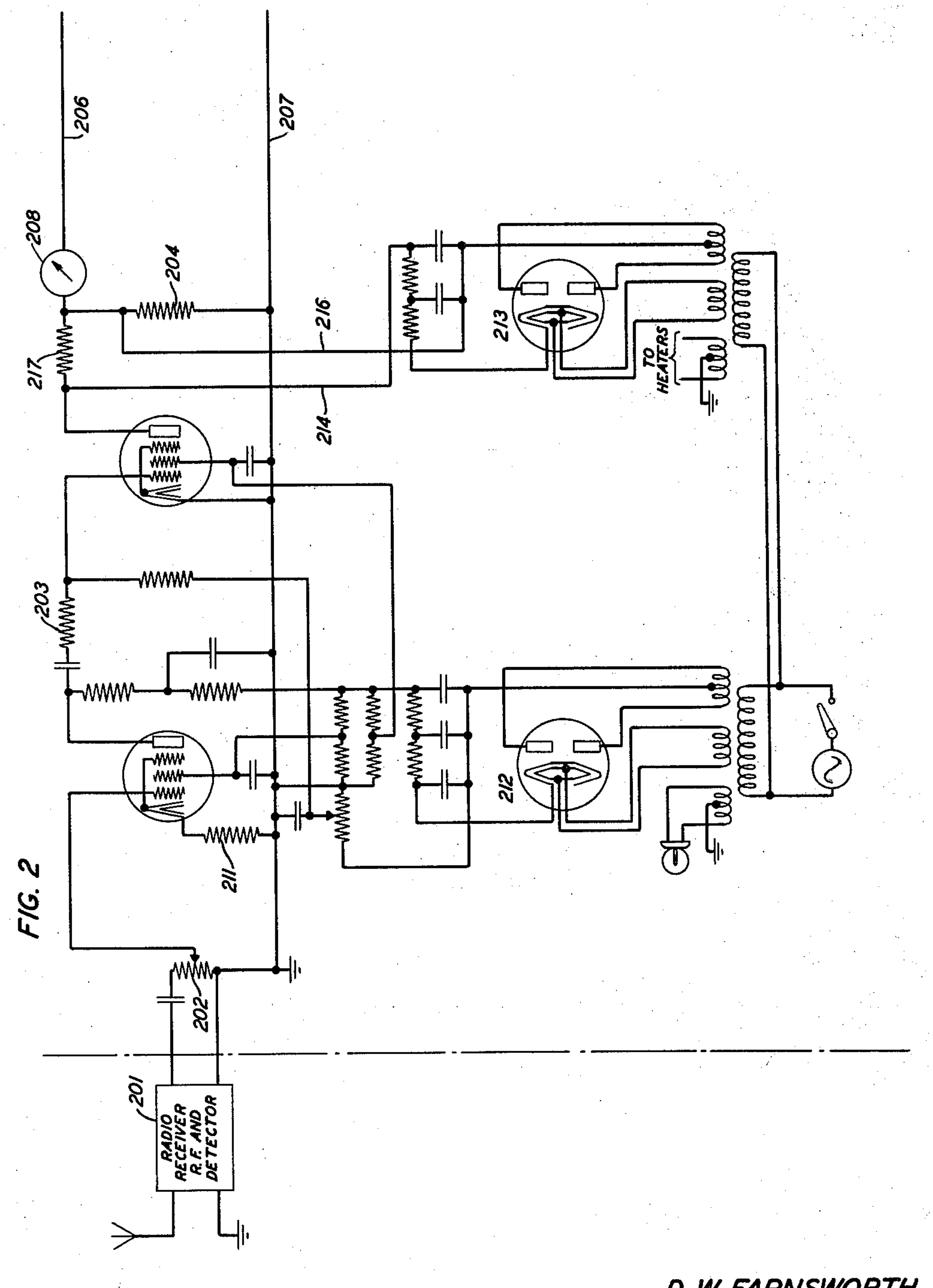
FIG. 2 is a schematic circuit diagram showing the radio receiver and the special receiving amplifier associated therewith.
Figure 3:
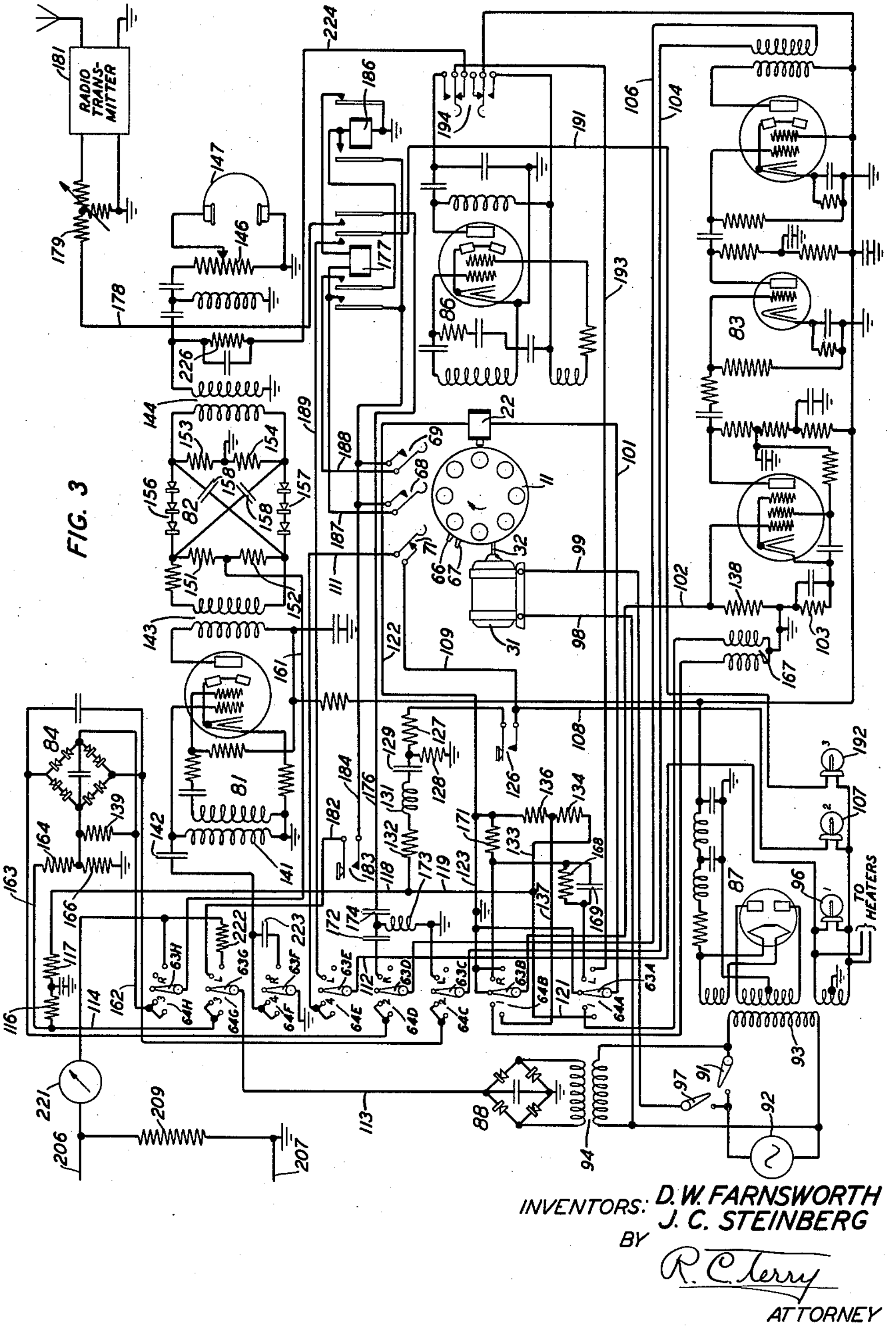
FIG. 3 is a schematic circuit diagram showing the complete magnetic tape recording and reproducing system including the control switch, the several tone generators, the keying arrangement and the radio transmitter.

FIGS. 2 and 3 when placed end to end with FIG. 3 at the right of FIG. 2 show the complete electrical system in accordance with the invention.

Figure 1:
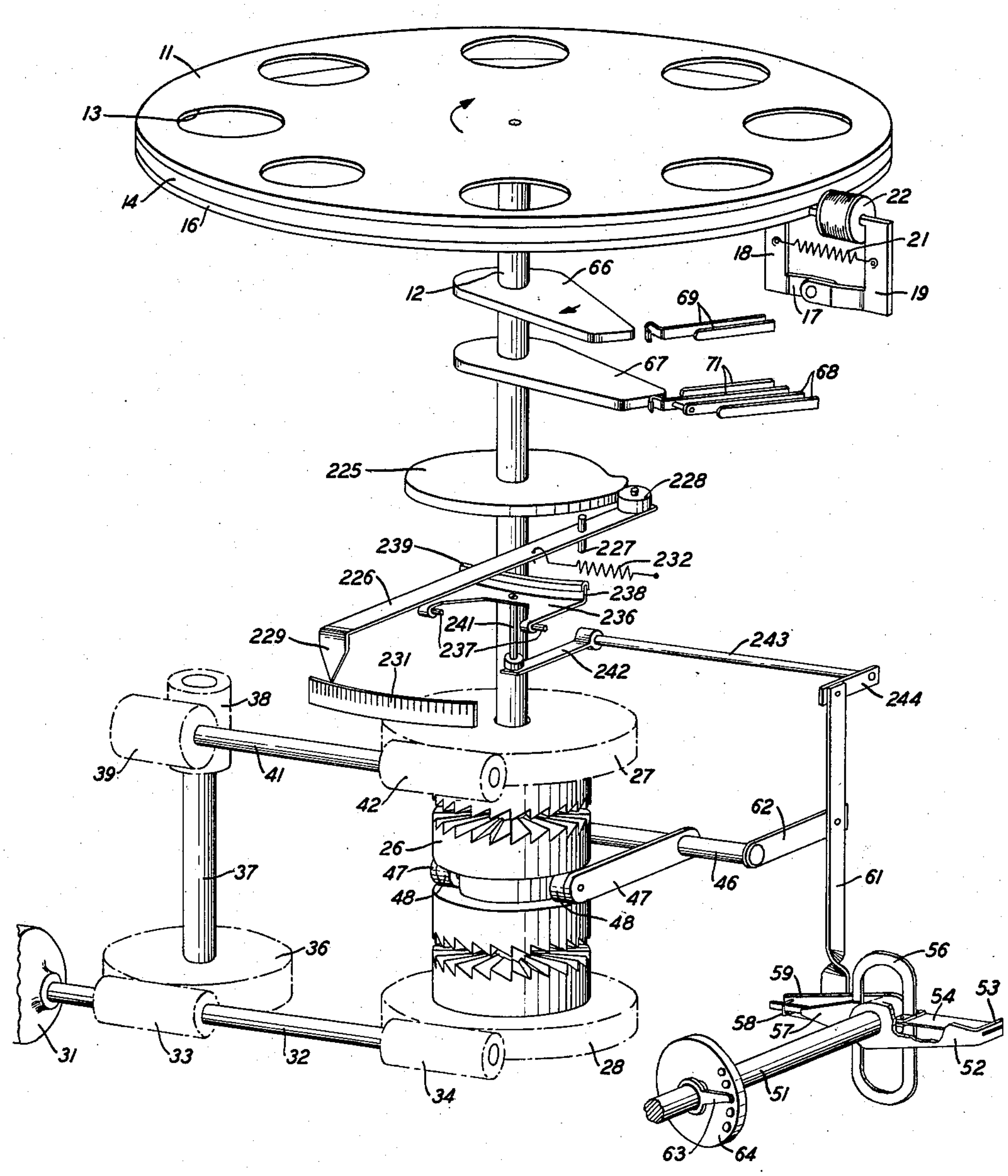
FIG. 1 is a schematic perspective view showing mechanical details of the tape driving mechanism and the combined switching and speed changing mechanism.

Referring now to the drawings and particularly to FIG. 1, the reference numeral 11 designates a wheel secured to a rotatable shaft 12. Wheel 11 is preferably of lightweight nonmagnetic metal and is further lightened by the provision of relatively large apertures 13 so as to provide a minimum inertia consistent with mechanical strength. Wheel 11 is provided with a depending peripheral flange to which is secured by means of clamping ring 14 a thin ribbon or tape 16 of magnetizable iron alloy. Tape 16 extends below the flange of wheel 11 so that a band of its inner surface as well as of its outer surface is exposed.

An electromagnet core 17 having pole-pieces 18 and 19 is so positioned with reference to wheel 11 that the pole faces are presented on opposite sides of and in alignment with magnetizable tape 16. Pole-pieces 18 and 19 are pivotally mounted on their supporting structure and are attrahently biased by spring 21 so that the pole faces engage the opposite surfaces of magnetizable tape 16. An inductive winding 22 is supported by pole-piece 19 and when winding 22 is energized by an electric current, a magnetic flux will be generated in the pole-pieces which will magnetize tape 16 if the tape is moved past the pole-pieces by rotation of shaft 12. Conversely, if tape 16 has been magnetized and is then moved past the pole-pieces, current will be induced in the winding 22.

Shaft 12 is mounted in suitable supporting bearings to hold wheel 11 in a fixed plane and has slidably splined or keyed thereon a clutch collar 26 which has toothed clutch faces at its opposite ends. Above and below the clutch collar 26 the shaft 12 supports for independent rotation worm wheels 27 and 28. Each of the worm wheels is provided with a hub presented toward the clutch collar 26 and the hubs are toothed for cooperating with the toothed faces of clutch collar 26 so as to impart rotation thereto and thus to shaft 12.

A constant speed motor 31 drives a shaft 32 which has secured thereto worm gears 33 and 34. Worm gear 33 meshes with a worm wheel 36 secured to a shaft 37 which also has secured thereto a spiral gear 38. Gear 38 meshes with a spiral gear 39 secured to a shaft 41 which also has secured thereto a worm gear 42 meshing with worm wheel 27. The shaft 32 also has secured thereto a worm gear 34 which meshes with the worm wheel 28.

From the foregoing it will be apparent that gears 27 and 28 are driven continuously from motor 31. The speed reduction from shaft 32 to worm wheel 28 through worm gear 34 is such that worm wheel 28 completes one revolution in a fraction of a second and according to one embodiment of the invention the speed of worm wheel 28 is 120 revolutions per minute which allows an interval of one-half second for one revolution of the worm wheel 28. The speed reduction imparted to worm wheel 27 from shaft 32 through worm gear 33 and worm gear 36, spiral gears 38 and 39 and worm gear 42 is such that the speed of worm wheel 27 is substantially $\frac{1}{100}$ of that of worm wheel 28, and in the embodiment of the invention above referred to the interval required for worm wheel 27 to complete one revolution at this speed reduction is fifty seconds.

Worm wheels 27 and 28 are so spaced upon shaft 12 that clutch collar 26 may occupy a position intermediate the hubs of those gears with its toothed faces out of engagement with the hubs of both gears. When the clutch collar is moved upwardly into engagement with the hub of gear 27, rotation is imparted to shaft 12 through the cooperating set of clutch teeth at the low speed. When the clutch collar is moved downwardly into engagement with the hub of the lower gear 28 rotation is imparted to shaft 12 at the high speed. Shaft 41 rotates in the same direction as shaft 32 so that shaft 12 is rotated in the same direction for both speeds.

A rocker shaft 46 carries spaced arms 47, the free ends of which support rollers 48. The rollers are disposed in a peripheral groove in clutch collar 26 for moving the clutch collar upwardly or downwardly as rocker shaft 46 is rocked in clockwise or counter-clockwise direction, respectively, as viewed from the right-hand end.

For shifting the clutch collar 26 upwardly or downwardly, a manually operable shaft 51 has secured thereto an arm 52 which has at its free end a laterally extending bifurcated portion 53. A flat flexible strip 54 of spring material has one end secured in the bifurcation of arm 52. The other end of flexible strip 54 is secured to laterally extending ears associated with an elongated closed loop structure 56 which circumscribes shaft 51 in clearance relation thereto. On the opposite side of loop 56 from the point of connection of flexible strip 54 an arm 57 is secured to the loop 56 and the arm 57 terminates in a reduced portion. The reduced portion of arm 57 is loosely disposed in a U-shaped staple 58 secured to an arm 59 which is loose on shaft 51. Arm 59 is pivotally connected by a link 61 to an arm 62 secured to rocker shaft 46.

In order to understand the utility of flexible strip 54 and loop 56, it is necessary to note that shaft 51 also carries a plurality of switch arms 63 one of which is shown in FIG. 1. The switch arms 63 are fixed on shaft 51 but are insulated therefrom and each of the switch arms cooperates with a bank of contacts and a maximum of five contacts in each bank is required to perform the necessary switching operation. The switch arms normally engage the middle contacts of the banks and in this position of shaft 51 clutch collar 26 is disengaged from the hubs of both of the gears 27 and 28. Upon rotation of shaft 51 in counter-clockwise direction a sufficient distance to bring the switch arms into engagement with the first or inner contacts, arm 52 is rocked in counter-clockwise direction and the structure comprising flexible strip 54, loop 56 and arm 57 operates substantially as a rigid structure and rocks in counter-clockwise direction with arm 52 to rock lever arm 59 in the same direction. Lever arm 59 moves link 61 downwardly thus rocking lever arm 62 and shaft 46 in clockwise direction as viewed at the right-hand end of shaft 46 to move clutch collar 26 into engagement with the hub of gear 27, low speed rotation being thereby imparted to shaft 12. Upon further rotation of shaft 51 in counter-clockwise direction to bring the switch arms into engagement with the outer contacts, further rotation cannot be imparted to arm 59 because clutch collar 26 has been moved upwardly to the limit of its movement. To the extent of the freedom existing between the reduced end of the lever arm 57 and the staple 58, which freedom is relatively slight, the structure comprising spring strip 54, loop 56 and arm 57 can still move substantially as a rigid body, the loop 56 moving downwardly with respect to shaft 51 as the reduced end of lever arm 57 rocks within staple 58. Staple 58 limits the downward movement of loop 56 with respect to shaft 51 before the limit of movement of lever arm 52 is reached and after the rocking of lever arm 57 with respect to staple 58 ceases, spring strip 54 flexes to accommodate the remainder of the movement of lever arm 52. It will be understood that spring strip 54 must have sufficient rigidity to move clutch collar 26 to establish driving connection to shaft 12 and must not yield materially until after such driving connection has been established. It will also be understood that shaft 51 may require detenting in the contact engaging positions and particularly in the extreme positions, so that the energy stored in spring strip 54, upon its being flexed, cannot move the switch arms 63 out of engagement with the contacts to which they have been moved. Such detenting is also necessary to enable an operator to move the switch arms into proper engagement with the several contacts, since the switch mechanism may be inside a housing from which the shaft 51 protrudes and to which an operating knob is fitted, so that the operator cannot see the operation of the switches.

The operation of the yieldable clutch controlling mechanism is in the reverse direction when shaft 51 is rocked clockwise from its center position. Clockwise movement is imparted to lever arm 59 which moves link 61 upwardly thus moving the clutch collar 26 into engagement with the hub of the lower gear 28, and in the movement of the contact arms to the extreme contact on the clockwise, side spring strip 54 yields to accommodate this movement.

Shaft 12 has secured thereto cams 66 and 67 which control electrical contacts. Cam 66 is effective to close one normally open pair of contacts 69 and cam 67 is effective to close one normally open pair of contacts 68 and open one normally closed pair of contacts 71. In point of time, cam 66 is slightly ahead of cam 67, and operates and releases contacts 69 first before cam 67 operates contacts 68 and 71.

Referring now to FIG. 3 the principal elements that are involved in the recording and reproducing of messages at low and high speeds are an oscillator 81 capable of generating alternating current at either of two frequencies, one of which may be 1,000 or 1,200 cycles and the other of which is 6,000 cycles, a modulator 82, a three-stage amplifier 83 for amplifying signals generated by tape recorder magnet 22 when the magnet is serving as a reproducer, a full-wave rectifier 84 for rectifying the output of amplifier 83 when recorded signals are being reproduced at low speed, an oscillator 86 for generating a high frequency alternating current for erasing recorded signals from the magnetizable tape, a plate voltage supply rectifier and filter 87 and a relay and bias voltage supply rectifier 88.

For the purpose of starting the magnetic tape recorder apparatus preparatory to recording a message to be transmitted, switch 91 is closed, which connects a power source 92 of alternating current to transformer 93, which supplies power to the plate voltage rectifier 87 and also supplies voltage to the filaments of all electron discharge tubes and to indicator lamps. The switch 91 also connects to the power source 92, a transformer 94 which supplies power to the full-wave rectifier circuit 88. An indicator lamp 96 is connected directly across the filament and indicator lamp supply winding of transformer 93, which is the lower secondary winding, and this lamp, which lights, is visible at the front panel of the apparatus cabinet and indicates that the power is on. The closure of a switch 97 connects motor 31 to power source 92 over conductors 98 and 99 and the motor is set in operation.

At the time of starting up the apparatus, shaft 51 (FIG. 1) of the combined switching and clutch shifting mechanism should be in its middle position so that the switch arms 63A to 63H, inclusive, will be engaging the middle contacts of the switch banks 64A to 64H, respectively. With the contact arms in this position, magnetic tape wheel 11 will not be rotating. It is assumed that the magnetic tape has previously been erased and that there are no signals recorded upon it.

The middle contacts of the contact banks 64A and 64B are connected to ground and no other one of the contact banks has a connection to its middle contact. The switch arm 63A is connected by conductor 101 to one terminal of the recording and reproducing magnet 22, the other terminal of which is connected to ground. Thus when the control switch is on its middle or neutral contact the winding of the recording magnet is short-circuited. The switch arm 63B is connected by conductor 102 to the control grid of the first tube of amplifier 83 so that the grid is at ground potential in the neutral condition of the control switch. The cathode of the first tube of amplifier 83 is more positive than ground by the drop across cathode resistor 103 so that the first tube of the amplifier is biased negatively. The output of amplifier 83 is connected by conductors 104 and 106 to the switch arms 63C and 63D which at this time engage dead contacts, so that there is no output from amplifier 83.

Preparatory to recording a message on the tape at low speed, the control switch arms 63A to 63H inclusive, are moved counter-clockwise to the inner left-hand contacts. This position is not the recording position but is actually the message reading position. Accompanying this operation the clutch is shifted to set the tape wheel 11 in rotation at the low speed. The purpose in switching to this position rather than past it to the outer left-hand contacts, which represent the low speed message recording position, is to set the tape wheel 11 in operation first and thereafter to switch to the recording position in accordance with a timing control the function of which is to indicate when the joint in the magnetizable tape has just passed the recording magnet, so that the joint will not traverse the recording magnet poles during message recording. The timing control is also effective in the low speed recording position, as will be described, but the operation of the control switch from the low speed message reading position to the recording position creates a disturbance in the recording magnet, which registers on the tape. By switching to the recording position about the time that the joint in the tape passes the recording magnet poles, neither the joint in the tape nor the disturbance produced in the tape by the disturbance in the recording magnet will be encountered during the recording of a message.

With the switch arms engaging the inner left-hand contacts a circuit may be traced from the lower terminal of the lower secondary winding of transformer 93 through indicator lamp 107, conductors 108 and 109, normally closed cam controlled contacts 71, conductor 111, inner left-hand contact of switch bank 64E, contact arm 63E and conductor 112 to the upper terminal of the lower secondary winding of transformer 93. Lamp 107 will therefore be lighted until cam 67 opens contacts 71, and this indicates to the operator that the control switch should not yet be operated to the low speed recording position. When cam 67 engages and opens contacts 71, the circuit of lamp 107 is opened and the lamp is extinguished. The tip of cam 67 is of such length in relation to the speed of tape wheel 11 that lamp 107 will remain extinguished for about two seconds. The joint in the recording tape passes the poles of the recording magnet in this two-second interval, and the switch arms 63A to 63H should be switched to the outer left-hand contacts in this interval. As soon as contacts 71 reclose, lamp 107 will again be lighted, and the operator should immediately start recording the message in order to have a maximum of tape available for message recording before the joint in the tape again passes the recording magnet 22. Lamp 107 is preferably located behind the translucent scale of a scale and pointer mechanism to serve to illuminate the scale and to provide a single point at which the lamp operation and the pointer operation are observed. The scale and pointer mechanism will be described hereinafter.

The circuits completed by the switch arms 63A and 63B through the inner left-hand contacts of their banks are of interest only in connection with low speed reading of a recorded message and they will be described in connection with the monitoring of the message after it has been recorded. In the other six banks of the control switch, the two left-hand contacts are connected together so that the same circuits are established in the message recording and message reading positions and they will be described now, it being assumed that the operator has moved the switch arms to the outer left-hand contacts during the interval in which lamp 107 was extinguished.

A direct current biasing circuit for the recording magnet 22 is traced from one of the output terminals of rectifier 88, the other terminal of which is connected to ground, through conductor 113, switch arm 63G, outer left-hand contact of switch bank 64G, conductor 114, resistors 116 and 117, conductors 118, 119 and 121, outer left-hand contact of bank 64A, switch arm 63A, conductor 101, winding of recording magnet 22 and conductors 122 and 123 to ground. The biasing current flowing in this circuit when the alternating signaling current is superimposed upon it will cause the magnetization of the tape to take place in the straight portion of the magnetization curve, thereby minimizing distortion. It is the introduction of this biasing current into the winding of magnet 22 which creates the disturbance in the tape previously mentioned.

For energizing the recording magnet 22 in accordance with signals to be recorded, a circuit is traced from the upper terminal of the lower secondary winding of transformer 93 through conductor 112, switch arm 63E and outer left-hand contact of bank 64E, conductor 111, normally closed contacts 71 and conductor 109 to one contact of a normally open telegraph key 126. The other contact of key 126 is connected through a potentiometer comprising resistors 127 and 128 to ground and as the mid-point of the lower secondary winding of transformer 93 is grounded, it will be seen that current flows in this circuit when key 126 is closed, resulting from a voltage which is one-half the voltage developed across the lower secondary winding of transformer 93. The voltage developed across this winding of the transformer is substantially 6.3 volts, since it supplies the filaments of the several electron discharge tubes and the voltage across the potentiometer comprising resistors 127 and 128 is thus found to be about 3 volts. This is an alternating current voltage at a frequency of 60 cycles per second which is the usual frequency of commercial power sources. The resistors 127 and 128 divide the alternating voltage to produce the optimum recording voltage and from the point of division a circuit is traced through condenser 129, inductance 131, resistor 132, conductors 119 and 121, outer left-hand contact of switch bank 64A, switch arm 63A, conductor 101 winding of recording magnet 22 and conductors 122 and 123 to ground through which the circuit is returned to the mid-point of the lower secondary winding of transformer 93 which is at the same potential as the lower end of resistor 128. Condenser 129, inductance 131 and resistor 132 form a pre-equalizing network which is used to improve the frequency response characteristic of the tape recording unit. Each time that telegraph key 126 is closed the recording magnet 22 is energized and the tape 16 (FIG. 1) is magnetized in accordance with the train of alternating current waves which traverse magnet 22 while key 126 is closed. Dots will be represented by short closure of key 126 and dashes by longer closure of the key.

In parallel relation to the alternating current path through the magnet 22, a path is traced from the junction point of conductors 119 and 121 through conductor 133, resistors 134 and 136 to conductor 123 and thence to ground so that a part of the alternating current traversing the pre-equalizing network is diverted through this path. The junction of resistors 134 and 136 is a further point of division and from this point a path extends over conductor 137, the outer left-hand contact of switch bank 64B, switch arm 63B, conductor 102 and resistor 138 to ground. The grid of the first tube of amplifier 83 is connected to the upper end of resistor 138 so that the grid potential of the tube varies in accordance with the alternating current potential across resistor 138, and amplifier 83 amplifies that portion of the signal voltage which flows through resistor 138.

The output of amplifier 83 is connected to the switch arms 63C and 63D over paths previously traced. The outer left-hand terminal of switch bank 64C is connected to one of the input terminals of rectifier 84 and the outer left-hand contact of bank 64D is connected to the other input terminal of rectifier 84. A resistor 139 is connected across the output terminals of rectifier 84 so that a unidirectional voltage is developed across resistor 139 for each train of alternating current waves amplified by the amplifier 83.

Before describing the effect of the development of a potential difference across the resistor 139 due to the rectification of a signal amplified by the amplifier 83, attention will be directed to the oscillator 81. The grid circuit of this oscillator includes an inductance 141 connected between the control grid and ground. The control grid of oscillator 81 is also connected through a condenser 142 to the outer left-hand terminal of switch bank 64F, and the switch arm 63F is grounded, so that condenser 142 is connected in parallel with inductance 141. Condenser 142 tunes oscillator 81 to a frequency of good audibility, such as 1000 cycles per second. The anode circuit of oscillator 81 includes the primary of a transformer 143. The secondary winding of transformer 143 is connected across the alternating current input terminals of modulator 82 and the alternating current output terminals of the modulator are connected to the primary winding of a transformer 144. The secondary winding of transformer 144 is connected through a high-pass filter network which passes the 1000-cycle tone generated by oscillator 81 but rejects any 60-cycle current that may be induced in the secondary winding of transformer 144, to a volume control 146 to which a headphone set 147 is connected.

The modulator 82 comprises resistors 151 and 152 connected in series between the alternating current input terminals, resistors 153 and 154 connected in series between the alternating current output terminals, a half wave rectifier 156 connected between the input and the output terminals on the side to which resistors 151 and 153 are connected, a half wave rectifier connected in the same direction between the input and output terminals on the side to which resistors 152 and 154 are connected and condensers 158 connected from the input terminals to the output terminals on the opposite side.

The junction of resistors 153 and 154 is one of the modulating voltage input terminals and is connected to ground, and the junction of resistors 151 and 152 is the other modulating voltage input terminal and is connected by conductor 161 to the switch arm 63H from which a path extends at this time through the outer left-hand contact of bank 64H over conductor 162 to the lower terminal of resistor 139. The circuit from rectifier 88 previously traced to resistor 116 for supplying biasing current to recording magnet 22 also extends from conductor 114 through conductor 163 and resistors 164 and 166 to ground. The potential difference across resistor 166 due to the flow of current therethrough is impressed as a biasing potential across the modulator 82 between the points at which ground and conductor 161 are connected, the potential being applied to the latter point through resistor 139, conductor 162, outer left-hand contact of switch bank 64H, switch arm 63H and conductor 161. The half wave rectifiers 156 and 157 are poled so as to be non-conducting to this biasing potential and the biasing potential makes the path between the secondary of transformer 143 and the primary of transformer 144 of high resistance so that the tone generated by oscillator 81 does not reach the headphone set 147. This condition exists when amplifier 83 is not supplying current to rectifier 84. However, during intervals that telegraph key 126 is closed and rectifier 84 is rectifying current from the output of amplifier 83, the potential developed across resistor 139 opposes the biasing voltage and thus increases the conductivity of the modulator circuit to the alternating current generated by oscillator 81. Thus the modulator circuit acts as a variable attenuator in which the attenuation of the alternating current from oscillator 81 is governed by the signal voltage opposing the fixed bias. The result is that when telegraph key 126 is closed, the alternating current tone from oscillator 81 reaches and is heard in headphone set 147 and when telegraph key 126 is opened the tone is cut off from the headphone set. By using the headphone set 147, the operator may monitor the signals as they are being recorded magnetically upon the tape.

As the tape wheel 11 approaches completion of a revolution during which recording of signals has been in progress, cam 67 will again open the contact 71. This interrupts the circuit over which the upper half of the lower secondary winding of transformer 93 has been supplying signaling current for energizing magnet 22 and also opens the circuit through which the whole of the lower secondary winding of transformer 93 has been supplying lamp 107. It does not follow that if telegraph key 126 is closed at the time contacts 71 are opened, the remainder of that impulse will be lost. It will be noted that a circuit may be traced from ground through the lower half of the lower secondary winding of transformer 93 through lamp 107, conductor 108, telegraph key 126 when closed and resistors 127 and 128 to ground. The alternating current flowing in the path just traced including the lamp 107 will magnetize the tape, but the circumstances under which the recording of a message will be in progress at the time the contacts 71 are opened should be extremely rare, as the operator should so prepare the message prior to recording it that its recording can be completed before the contacts open. Lamp 107 will not be lighted due to current flowing in this path because only half the voltage generated across the lower secondary winding of transformer 93 will be impressed upon the path, whereas lamp 107 normally receives the full voltage across this secondary winding of the transformer and, in addition, the potentiometer comprising resistors 127 and 128 will further reduce the voltage across the terminals of the lamp. Thus lamp 107 will not fail to become extinguished to indicate to the operator that contacts 71 have opened even though telegraph key 126 may be closed at the time contacts 71 open.

Not later than the end of the two-second interval during which contacts 71 are opened the operator should operate the control switch away from the low speed recording position and into the low speed message reading position, which is the inner left-hand contact position of switch arms 63A to 63H inclusive, if it is desired to monitor the recorded message before transmission, or into the neutral position. The reason for this is that as long as tape wheel 11 continues to rotate with the control switch in the low speed recording position, the direct current bias for recording magnet 22 from rectifier 88 will continue to flow, and the magnetic field produced by the biasing current will obliterate or otherwise impair the signals which have been recorded on the tape. It will be assumed that the operator desires to monitor the recorded message and moves the switch arms to the inner left-hand contacts. No circuit changes take place in the switch banks 64C to 64H inclusive, because the two left-hand contacts of each bank are connected together. Thus the biasing voltage remains applied to modulator 82, the output of amplifier 83 remains connected to rectifier 84, the oscillator 81 remains tuned to a frequency of 1000 cycles per second, and the circuit of lamp 107 remains prepared and the lamp relights upon the closure of contacts 71. At the contact bank 64A the lower terminal of recording magnet 22 is disconnected from the biasing current and signaling current sources, and is connected instead to the upper terminal of the primary winding of a transformer 167. At the contact bank 64B the grid of the first tube of amplifier 83 is disconnected from the potentiometer comprising resistors 134 and 136 and is connected instead to the corresponding terminal of the secondary winding of transformer 167. The other or lower primary and secondary terminals of transformer 167 are connected to ground. Transformer 167 serves as an input transformer for the amplifier 83 to step up the voltage derived from magnet 22 when the magnet is serving as a reproducing magnet with the tape wheel 11 being driven at the low speed, since the voltage which will be generated in the winding of magnet 22 is much lower than the voltage obtained at the junction point of resistors 134 and 136 for monitoring during the recording of the signals at low speed. If the control switch has been operated to the low speed message reading position during the interval that lamp 107 is dark, the recorded message will be heard in the headphone set 147 from the point of beginning, the signals being reproduced by the magnet 22, converted to a higher voltage level by the transformer 167, amplified by the amplifier 83, rectified by the rectifier 84 to key the output of oscillator 81 by means of modulator 82.

For the transmission of the recorded message at high speed the control switch is operated to bring the switch arms 63A to 63H inclusive, into engagement with the inner right-hand contacts of the switch banks 64A to 64H inclusive. In making this adjustment the switch arms 63A to 63H and the clutch collar 26 (FIG. 1) are moved through the neutral position and the clutch collar is shifted into engagement with the hub of gear 28 to impart high speed rotation to tape wheel 11.

At the contact bank 64A and switch arm 63A, the lower terminal of magnet 22 is connected through resistor 168, shunted by condenser 169 and then through resistor 171 to the upper terminal of magnet 22. At the contact bank 64B and switch arm 63B, the junction point of resistors 168 and 171 is connected to the grid of the first tube of amplifier 83 and to the upper end of resistor 138. The right-hand terminal of resistor 171 is at ground potential since the upper terminal of magnet 22 is at this potential so that resistor 138 in the input circuit of amplifier 83 is connected in parallel with resistor 171 and the voltages impressed on resistor 138 to control the first tube of amplifier 83 will equal the voltages appearing across resistor 171. The combination of resistors 168 and 171 and condenser 169 serves to equalize the high frequency response of the system.

The resistors 168 and 171 also serve to adjust the signal voltage applied to the input circuit of the amplifier 83 to the proper value. With the tape wheel 11 rotating at high speed, the cycles of alternating current which were recorded on the tape at the rate of 60 cycles per second, are moved past the poles of magnet 22 at one hundred times this frequency or at 6000 cycles per second, so that the reproduced signals will be of the latter frequency. In reproducing material which has been magnetically recorded on a tape, the voltage level generated by the reproducing magnet is substantially directly proportional to the tape speed. Thus the voltage at the terminals of magnet 22 will be substantially one hundred times as great as the voltage which appeared at those terminals when the message recorded at low speed was monitored at low speed. Thus, not only is the transformer 167 not required when reproducing signals at high speed, but the network comprising resistors 168 and 171 is introduced between the magnet 22 and the input circuit of amplifier 83 so that only that portion of the voltage appearing at the terminals of reproducing magnet 22 will be impressed upon the input circuit of amplifier 83 which will give the desired signal level at the output of the amplifier.

The output of amplifier 83 which appears at the switch arms 63C and 63D is applied through condenser 172 to inductance 173, the lower terminal of which is connected to ground. From the upper terminal of inductance 173 a conductive path for alternating current extends through condenser 174 and conductor 176 to the outer right-hand armature of a relay 177. The outer right-hand front contact of relay 177 is connected over conductor 178 to a volume control network 179 which is connected in the modulator circuit of a radio transmitter 181. Volume control network 179 has a ground connection which establishes the return path to the lower terminal of inductance 173. It will be apparent from the foregoing that the output of amplifier 83 has been disconnected from rectifier 84 and that a connection has been prepared from the output of the amplifier to the input of radio transmitter 181, but that this path will not be completed until relay 177 has become energized. Preferably, the modulator circuit of the radio transmitter includes a rectifier for producing direct current pulses corresponding to the 6000 cycle trains of waves, and the direct current pulses control a keyer for keying the carrier wave generated by the transmitter in on and off manner, the carrier being transmitted during the direct current pulses and being cut-off before, between and after them.

There is no connection to the inner right-hand contact of switch bank 64F nor to the corresponding contact of bank 64H so that no circuits are completed from or through the switch arms 63F or 63H at this time. Switch arm 63G extends a connection from rectifier 88 over conductor 182 to one terminal of normally open non-locking push-button switch 183. From the other terminal of switch 183 conductor 184 extends to one contact spring of each of the pairs of normally open contacts 68 and 69, to the outer left-hand armature of relay 177 and to the left-hand armature of a relay 186. The completion of a circuit from inductance 173 to the input of radio transmitter 181 results from a series of operations initiated by the closure of switch 183.

With tape wheel 11 running at high speed, cam 66 closes contacts 69, and substantially immediately after contacts 69 open, cam 67 closes contacts 68, each pair of contacts being closed only momentarily, due to the high speed of operation of the cams at this time. The closure of these contacts occurs as the beginning of the recorded message is approaching the poles of reproducing magnet 22. With switch 183 closed, the contacts 68 complete a circuit from conductor 184 over conductor 187, winding of relay 177 and back contact and right-hand armature of relay 186 to ground, thus energizing the relay 177 from rectifier 88. Contacts 69 upon being closed, sought to complete the energizing circuit for relay 186 from conductor 184 over conductor 188, but this conductor extends to the inner left-hand front contact of relay 177 where the path to the winding of relay 186 is open at the inner left-hand armature of relay 177 which does not become operated by contacts 68 until after contacts 69 have been closed and have reopened.

At its outer left-hand armature and front contact relay 177 completes a holding circuit for itself in parallel with contacts 68 to ground on the right-hand armature of relay 186 so that relay 177 will remain energized after contacts 68 open. At the outer right-hand armature and front contact the circuit to the input of radio transmitter 181 is completed, so that the recorded message which is being reproduced by magnet 22 is impressed on the radio transmitter beginning at the beginning of the message. At the inner right-hand armature and front contact of relay 177, a circuit is completed from the upper terminal of the lower secondary winding of transformer 93 over conductor 112, switch arm 63E, the inner right-hand contact of switch bank 64E, conductor 189, the inner right-hand armature and front contact of relay 177, conductor 191 and the indicator lamp 192 to the lower terminal of the lower secondary winding of transformer 93. Lamp 192 lights, which is an indication to the operator that the recorded message is being impressed upon the radio transmitter 181. It is necessary for the operator to hold key 183 closed during the interval required for the transmission of the message because the holding circuit for relay 177 is through conductor 184 and switch 183 to the rectifier 88. Since as stated earlier, wheel 11, when rotating at the high speed completes one revolution in approximately one-half second, the actual transmission of the message will occupy slightly less than this time in view of the fact that message material was not recorded on the tape during the two-second interval in which contacts 71 were open, and this blank portion of the tape traverses the poles of magnet 22 in two one-hundredths of a second at the high speed.

At the end of one revolution of tape wheel 11, contacts 69 and 68 are again closed momentarily in succession in that order. The closure of contacts 68 produces no result because relay 177 is already energized. Contacts 69 complete the circuit previously prepared by relay 177 for relay 186 and this relay becomes energized. At its right-hand armature, relay 186 interrupts the circuit of relay 177 which releases. At its left-hand armature relay 186 completes its holding circuit back through conductor 184 and closed switch 183 to rectifier 88. As a result of the release of relay 177 the inductance 173 in the circuit of reproducing magnet 22 is disconnected from radio transmitter 181 so that the transmission of the message is terminated, the end of the message already having passed the poles of magnet 22 since relay 186 became energized substantially one revolution of tape wheel 11 after relay 177 was energized. Relay 177 also interrupts the circuit of indicator lamp 192 which becomes extinguished. It will be recognized that the circuit of lamp 192 was closed only for an interval of one-half second but this is sufficient for lamp 192 to become fully lighted, and its extinguishment indicates to the operator the completion of transmission of the message. The relay 177 also interrupts the locking circuit over which it had been held energized and which is now open also at the right-hand armature of relay 186 and interrupts the primary energizing circuit of relay 186 which is now held over an alternate circuit. Relay 186 will remain energized as long as switch 183 remains closed but relay 177 cannot become reenergized although tape wheel 11 continues to rotate at high speed and repetitiously closes contacts 68 and 69, and thus the recorded message will be transmitted only once. Upon the extinguishment of lamp 192, the operator will have no further reason for holding switch 183 closed and, accordingly, will release it. This will release relay 186 thus restoring the relay system to normal.

The control switch may then be restored to neutral but since there will presumably be no reason for retaining the recorded message on the tape, since it has been transmitted, the next operation would logically be to delete the stored message from the tape. The apparatus is prepared for deletion of the stored message by operating the switch arms 63A and 63H, inclusive, to the outer right-hand contacts of the switch banks 64A to 64H, inclusive. This is also the high speed message recording position for recording messages transmitted by radio from a station identical with that herein disclosed.

Only the switch arms 63A and 63B complete connections which pertain to the deletion of a stored message from tape 16, so that connections to the outer right-hand contacts of other banks of the control switch, which pertain to the high speed recording of a received message, will be disregarded for the present. Switch arm 63A connects the lower terminal of recording magnet 22 over conductor 193 to the upper swinger spring of a double-pole, double-throw, non-locking key 194. The conductive path from the inner spring which the upper swinger spring normally engages, relates to high speed message reception and will be described later. The outer spring with which the upper swinger spring of key 194 cooperates when the key is operated to the off-normal condition, is connected to the anode circuit of message erasing oscillator 86, the cathode of which is connected to ground through which a return path is traced to conductor 123 and thus through conductor 122 to the upper terminal of magnet 22. The lower swinger spring of key 194 is connected to the high potential side of power supply rectifier and filter circuit 87 and the inner spring with which the lower swinger spring normally cooperates has no connection. The outer spring with which the lower swinger spring of key 194 cooperates in the off-normal condition is connected to the load circuit path of oscillator 86.

The control switch having been adjusted to the position for deletion of the stored message as described above, key 194 is operated to the off-normal condition for an interval of several revolutions of tape wheel 11. This completes the anode load circuit of oscillator 86 and also connects the anode circuit to the recording magnet 22. The constants of the input circuit of oscillator 86 are such that the oscillator generates alternating current at a frequency that is high compared with any signal frequency and that records on the tape a wave-length that is small compared with the pole-piece dimensions of the recording magnet. In accordance with one embodiment of the invention, the erasing oscillator 86 generates and impresses upon the recording magnet 22 a frequency of 40,000 cycles per second. The effect of impressing alternating current at a frequency of this order upon the recording magnet is that as the tape leaves the pole-pieces it is completely demagnetized, thus deleting therefrom the stored record. After the tape wheel 11 has been permitted to rotate for several revolutions with the signal erasing frequency impressed on magnet 22, key 194 may be restored to normal to open the anode circuit of oscillator 86 and to disconnect that circuit from recording magnet 22 and the control switch may be restored to the neutral position. With the driving clutch for wheel 11 disengaged the wheel stops and the tape 16 carried thereby is in condition for the recording of a message at low speed by means of telegraph key 126 or of a received message at high speed.

Referring now to FIG. 2, the radio receiver by means of which high speed telegraph signals may be received, is designated by the reference numeral 201. The radio receiver 201 consists preferably of a radio frequency selecting and amplifying section and a detector only, without the usual audio or voice frequency amplifier section, because a separate signal amplifier, particularly adapted to the present invention, is employed. Furthermore, no beat frequency oscillator is employed in association with the detector so that the trains of alternating carrier current waves are rectified in the detector to produce direct current pulses corresponding to the telegraph signals. The detector output circuit of radio receiver 201 includes the volume control potentiometer 202. One terminal of potentiometer 202 is connected to ground and preferably this is the positive end of the potentiometer so that the other end which is connected to the condenser is negative.

The contactor of potentiometer 202 is connected to the control grid of the first stage of audio frequency amplifier 203 which consists of two stages. The second stage of the amplifier is coupled to the first through a resistance-capacity coupling. The voltage applied to the grid of the first stage of amplifier 203 as the result of the appearance of a signal pulse in the detector circuit of radio receiver 201 swings the grid of the first tube in a negative direction from its fixed bias point. The swing of the grid of the second or power stage of the amplifier resulting from the negative swing of the grid of the first stage is opposite and therefore is always positive with reference to the fixed bias voltage of the second stage. The second or power stage is biased just beyond plate current cut-off so that when signals are applied to the grid of the first stage, direct current pulses corresponding to the signals appear in the output circuit of the second or power stage. The anode of the power stage is connected to the positive terminal of a power supply load resistor 217. The negative terminal of the power supply load resistor 217 is connected through an output meter 208 and conductor 206 to the upper terminal of a resistor 209 and also through a meter 221 to the outer right-hand terminal of switch bank 63H. The lower terminal of resistor 209 is connected to ground and also through conductor 207 to the cathode of the power stage tube. The modulator circuit 82 in FIG. 3 is the load circuit for the output stage of the amplifier shown in FIG. 2 when the switch arms 63A to 63H are moved to the outer right-hand contacts as will be described later. Since the resistance of the modulator is non-linear, the resistor 209 which is connected between conductors 206 and 207 helps to keep the line impedance more uniform and when the modulator 82 is not connected to conductor 206 through switch bank 64H and the meter 221, resistor 209 serves as a load resistor for the output circuit of the amplifier.

Conductors 206 and 207 represent a cord for connecting the amplifier 203 to the magnetic recorder system shown in FIG. 3, since it has been found convenient to provide the amplifier 203 as a separate unit from the apparatus shown in FIG. 3 and also from the radio receiver 201. Conductor 207 is connected directly to the cathode of the electron discharge tube in the second stage of amplifier 203 and to the cathode of the electron discharge tube in the first stage through grid biasing resistor 211 and is connected to ground within the amplifier as well as being connected to ground within the magnetic recorder unit as indicated at the lower end of resistor 209.

It will be noted that separate power supply rectifier and filter units 212 and 213 are provided for the electron discharge tubes in the first and second stages respectively of amplifier 203. The separate power supplies for the two tubes have been provided because of the location of the load impedance for the power stage at the opposite end of the cord comprising conductors 206 and 207 from the amplifier 203. It is to be observed that the anode of the output tube of amplifier 203 is connected directly to the positive side of the power supply load resistor 217 rather than through an anode circuit series load resistor as is the more conventional practice. From the positive side of power supply 213 the anode circuit is traced through conductor 214 to the plate of the power tube, through the space discharge path within the tube to the cathode then rightwardly along conductor 207 to the lower end of load shunt resistor 209, upwardly through resistor 209, conductor 206, meter 208 and conductor 216 to the negative side of power supply 213. The purpose in connecting the load impedance of the final or power stage of the amplifier between the cathode and the negative side of the power supply rather than between the plate of the power tube and the positive side of the power supply is to keep high voltage out of the cord comprising conductors 206 and 207 which connects the amplifier to the magnetic recorder unit. If only a single power supply were to be provided for both of the electron discharge tubes in amplifier 203, a circuit for the power tube of the amplifier could be traced from the positive side of such power supply through conductor 214 to the plate of the power tube, through the space discharge path of the tube to the cathode, then leftwardly along conductor 207 to the point at which the lower end of resistor 211 in the cathode circuit of the first tube of the amplifier returns to the negative side of such single power supply. There would thus be a direct path to negative potential in shunt relation to the load impedance and no signals would appear in the modulator contained in the magnetic recorder unit (FIG. 3). By the provision of the separate power supplies 212 and 213 the anode-cathode circuits of the two electron discharge tubes in the amplifier are segregated and the load circuit of the power stage can be included in the cathode return of the power stage, thus keeping high voltage out of the connecting cord. A high resistance shunt 204 is associated with the load circuit.

The amplifier 203 is a high gain amplifier of the limiting type. A minimum input voltage of about .3 volt is required for full output but as the input voltage is increased beyond this value, little change in the output will result. Thus a signal of substantially constant amplitude will be furnished to the input of the magnetic recorder unit regardless of variations of the level at the radio receiver output, provided it always exceeds the minimum required voltage.

The potentiometer 202 between the output of radio receiver 201 and grid of the first tube of amplifier 203 is provided to reduce the sensitivity of the amplifier in order to discriminate against interference, which may be noise and multiple path reception, and also to minimize the effect of fading. Since the amplifier 203 is of a sharply limiting type, it will handle a wide volume range on its input and accordingly, prior to reception of signals, the gain control in the radio receiver should be set high enough to handle any anticipated fading to the best advantage. The gain control 202 at the input of the amplifier 203 should be set as high as the noise condition permits. This may be done by adjusting the gain to the point where the noise level prevailing at the time signals are to be received just fails to cause a reading on the milliammeter 208 or gives only occasional small readings as noise peaks are received. Satisfactory reception of signals will be indicated by mid-scale deflection of the meter 208.

The output tube of the amplifier 203 is biased to plate current cut-off as previously mentioned. Under these conditions the output current variation is non-linear with respect to the input voltage variation. Small input voltages produce only very small plate currents, but input voltages of the order of the bias voltage produce currents which are proportionally much greater. Thus by properly adjusting the gain, a signal having a relatively small voltage value above the noise level prevailing during the recording period, which is of the order of one-half second for one revolution of the tape wheel 11 at high speed, will by virtue of the non-linear expansion in the amplifier 203 give satisfactory reception of the signal. The high degree of discrimination against noise due to the non-linear amplification of a signal having a voltage value reasonably in excess of the noise voltage value, also affords a high degree of discrimination against multiple path reception of signals. In the case of multiple path reception, there is usually a substantial signal strength difference between the signals received over the different paths. If the signals received over only one of the multiple paths are above the noise level, the signals over other paths will be blanketed by the noise and only the signal which is above the noise level will be amplified by the amplifier to a level which will be recorded on the magnetic tape.

The peak current in the second or power tube of amplifier 203 is effectively limited to the value which obtains when the grid circuit of the tube begins to draw current, which occurs when the potential of the grid becomes substantially equal to the potential of the cathode of the power tube. A further limitation is provided in the first stage in that the grid of the first tube is biased more positive than the cut-off voltage and the signal impulses drive the grid of the tube more negative. If a signal is strong enough to drive the first tube to cut-off, the positive voltage applied to the grid of the output tube at the cut-off point of the input tube is a limiting factor on the plate current in the output tube. Therefore, the amplifier will handle high input voltages without considerable change in value or form of the output wave.

Reception and recording of telegraph signals at high speed presupposes a carefully timed transmission schedule, so that the receiving operator can adjust the gain of amplifier 203 and can adjust the control switch to the high speed receiving position shortly before the transmission time. The latter is accomplished by moving the switch arms 63A to 63H to the outer right-hand contacts of switch banks 64A to 64H. This operation is accompanied by mechanical shifting of the clutch to impart high speed continuous rotation to tape wheel 11. Although the exact time when the message should be received is known, no effort is made to synchronize the rotation of wheel 11 with the message receiving time from the standpoint of having the joint in the tape pass the poles of the recording magnet just before the message begins to be received. It will be apparent from this that the joint is likely to pass the poles of the recording magnet during the recording of the received message. However, if there is little or no gap at the joint in the tape, the impairment of the message will be insignificant.

The upper or negative terminal of load resistor 209 of amplifier 203 which load resistor is at the magnetic recorder end of the cord connecting the magnetic recorder to the amplifier 203 and is contained within the magnetic recorder unit, is connected through a signal level meter 221, the deflection of which when signals are received will be evidence of such reception, to the outer right-hand contact of switch bank 64H and is thus connected through switch arm 63H and conductor 161 to the junction of resistors 151 and 152 in the modulator circuit. The other terminal of the modulator circuit is represented by the grounded junction between resistors 153 and 154 and the lower or positive terminal of resistor 209 is grounded to establish the return path for the signal voltage impressed on the modulator. The outer right-hand terminal of switch bank 64G, which receives connection to rectifier 88 through switch arm 63G, is connected through voltage dropping resistor 222 to the outer right-hand terminal of switch bank 64H and thus to the junction of resistors 151 and 152 in the modulator 82 for biasing the modulator to prevent the transmission of alternating current from oscillator 81 except when the biasing voltage is opposed by a signal voltage appearing across load resistor 209. At the outer right-hand contact of switch bank 64F a condenser 223 is connected in series with condenser 142 between ground and the upper terminal of inductance 141. The two condensers in series tune the frequency of oscillator 81 to 6,000 cycles per second which corresponds to the frequency of the alternating current waves comprising the telegraph signals as transmitted at high speed. Switch banks 64C, 64D and 64E have no connection at the outer right-hand contacts. The outer right-hand contact of switch bank 64B is connected to ground and this connection is extended over conductor 102 to the grid of the first tube of amplifier 83 to reduce the sensitivity of this amplifier which has its output circuit open at this time and performs no function in connection with the high speed recording of received signals. The circuit for the application of received signals to recording magnet 22 is traced from ground through conductors 123 and 122, winding of magnet 22, conductor 101, switch arm 63A and the outer right-hand contact of switch bank 64A, conductor 193, inner contact spring and unoperated upper swinger spring of key 194 associated with the output circuit of erasing oscillator 86, conductor 224, resistor 226, shunted by a condenser, and secondary winding of transformer 144 in the alternating current output side of modulator 82 to ground.

Since the output of amplifier 203 (FIG. 2) is in the form of direct current pulses corresponding to the received signals as previously stated, it is not necessary to rectify these signals as it was in the case of amplification of signals by amplifier 83 and, accordingly, the signals amplified by the amplifier 203 are applied directly to the modulator 82 where they permit the flow of alternating current at 6,000 cycles per second from oscillator 81 in transformer 144 in accordance with the signals. The recording magnet 22 and resistor 226 in series therewith are connected in parallel with the secondary winding of transformer 144 and, accordingly, the modulated 6,000-cycle tone energizes magnet 22 to record trains of alternating current on the magnetizable tape 16. The received message is recorded in something less than a full revolution of tape wheel 11 because the high speed of the wheel is substantially the same at all stations.

The headphone set being connected to the output transformer of the modulator 82, the keyed 6,000-cycle tone can be heard in the headphone set during high speed signal reception. This monitoring arrangement also provides an audible check on the adjustment of the gain of amplifier 203 prior to signal reception. The control switch must be operated to the outer right-hand contacts to connect the modulator to the output of the amplifier. With the gain of the amplifier adjusted upwardly to the point where considerable deflection of the meter occurs due to received and amplified noise, such noise will operate the modulator and the 6,000-cycle tone as modulated by the noise will be heard. The gain should then be tuned down until noise voltage modulation of the 6,000-cycle tone just fails to be heard. This setting of the gain control should just fail to produce deflection of the meters, as previously described.

Since high speed rotation of the tape wheel occurs while the modulator is connected to the output of amplifier 203, noise modulation of the 6,000-cycle tone that is heard in the headphone set during aural monitoring of the gain adjustment will be recorded on the magnetizable tape. This must be erased before the recording of signals can take place. The erasure of stored signals has already been described.

Following the recording of the received signals the operator adjusts the control switch to the low speed message reading position, which is the position represented by the inner left-hand contacts of the switch banks 64A to 64H. The circuit conditions established for this adjustment of the control switch have been described in detail previously in connection with the description of the monitoring of a message after recording at low speed. It involves connection of the recording and reproducing magnet 22 to the input of amplifier 83 through transformer 167 and without attenuator networks, connection of the output of amplifier 83 to rectifier 84, connection of the output of rectifier 84 to the modulator 82, and removal of the condenser 223 from the grid circuit of oscillator 81 to reduce the frequency generated by that oscillator to 1,000 cycles per second. The reduction of the speed of tape wheel 11 to 1/100 of its high speed has the effect of reducing to 60 cycles per second the speed of reproducing the telegraph signals which were recorded at a frequency of 6,000 cycles per second. This corresponds to the frequency at which signals are recorded at low speed as previously described. The reproduced 60-cycle signals are rectified in the rectifier 84, and key the 1,000-cycle tone in the modulator 82. The keyed tone is heard in the headphone set 147. After the received message has been reproduced at low speed, heard in the headphone set 147 and a record of the message made, if desired, the recorded message may be erased by switching the control switch to the high speed receiving position and operating key 194 as previously described.

In connection with the transmission at high speed of a message recorded at low speed, it was set forth that the voltages developed across reproducing magnet 22 relative to the voltages developed by reproducing the message at low speed are in proportion to the two speeds, which occasions the use of an attenuator network between the reproducing magnet 22 and the amplifier 83 and which also occasions the omission of transformer 167. The same condition obtains with reference to the reproduction at low speed of a message recorded at high speed and the change is in the opposite direction. It is for this reason that the attenuator network is omitted and transformer 167 is used when reproducing at low speed a message recorded at high speed, and the level of the 6,000-cycle tone generated by oscillator 81 when recording at high speed must be high enough that the voltage developed in reproducing magnet 22 when the signals are reproduced at low speed will be adequate after amplification by amplifier 83 and rectification by rectifier 84 to oppose the bias on the modulator 82 and permit the appearance of 1,000-cycle tone from oscillator 81 at sufficient volume to be heard in headphone set 147.

It will be noted that whereas a direct current bias is applied to the recording magnet when recording 60-cycle tone at low speed, no direct current bias is applied to the magnet when recording the 6,000-cycle tone at high speed. In the case of the low speed recording the operator has an interval of two seconds indicated by the extinguishment of lamp 107 in which to switch the control switch arms 63A to 63H out of the low speed recording position thereby removing the bias from recording magnet 22 and preventing obliteration of the recorded message by magnetization resulting from the biasing current. In the case of recording a received message at high speed there is no opportunity for an operator to perform a manual switching operation for the purpose of disconnecting a source of biasing current and in the next revolution following the message recording revolution the recorded message would be obliterated by the magnetizing effect of the biasing current. Furthermore, it is not feasible to provide a mechanical arrangement under the control of the rotating tape wheel 11 for disconnecting biasing current, such as by a cam similar to the cams 66 and 67, since the tape wheel 11 may occupy any random instantaneous position at the time message reception begins and ends. The alternative would be to provide means responsive to a start signal preceding a message for connecting a source of biasing current to the recording magnet 22 and timing means for disconnecting the source of biasing current after an interval of slightly less than one-half second. Such an arrangement could be provided but it would introduce needless complexity in the apparatus since it has been found that by employing high frequency erasing current to demagnetize the tape completely, satisfactory recording at high speed without bias is achieved.

In the foregoing specification, the tape wheel speeds and the alternating current frequencies specified are purely by way of exemplification of the invention and are not intended to be restrictive. Thus the low speed recording tone may be other than 60 cycles per second, the low speed message reading tone may be other than 1,000 cycles per second, the high and low tape speeds may be other than 120 revolutions per minute and 1.2 revolutions per minute respectively, and the ratio between the high and low speeds may be other than 100 to 1. Furthermore, it is not requisite that the frequency which is keyed for recording at high speed shall be in exactly the same proportion to the frequency which is keyed for recording at low speed that the high speed of the tape wheel is to the low speed. However, it is desirable that these ratios shall not differ by a wide margin, so that there will be little difference in frequency response between the low speed reading of a received message and the low speed reading of a locally recorded message as for monitoring of the message prior to transmission.

As hereinbefore set forth, the interval during which lamp 107 is lighted is the interval during which signals may be recorded on the magnetizable tape at low speed, the beginning of the interval being indicated by lighting of the lamp and the end of the interval being indicated by the extinguishment of the lamp under the control of contacts 71. This affords no progressive indication of the filled and unfilled portions of the tape. An arrangement for giving such progressive indication is shown in FIG. 1. This device includes the cam 225 secured to shaft 12, the lever 226 pivoted at 227 and having cam follower roller 228 at its inner end, depending indicator pointer 229 at its outer end, and scale 231 with which pointer 229 cooperates. A tension spring 232 biases lever 226 in counter-clockwise direction to bring roller 228 into engagement with cam 225.

Cam 225 is provided with a single sharp drop-off and the rate of change of the radius of cam 225 from minimum to maximum is such as to move pointer 229 from the right-hand end of scale 231 to the left-hand end in direct proportion to the advancement of tape wheel 11 through one revolution thereof. When cam follower roller 228 descends the sharp drop-off in cam 225, pointer 229 is quickly restored by spring 232 to the right-hand end of scale 231. Scale 231 is preferably mounted on the front of the apparatus housing for the magnetic recorder unit and pointer 229 extends through a slot in the front of such housing.

As the recording of signals at low speed proceeds, the operator may at any time determine the remaining quantity of magnetic tape available for signal storage by observing the instantaneous position of pointer 229 with respect to scale 231. Preferably, scale 231 is translucent and lamp 107 which indicates the recording interval is located behind it. In this way, the dual indication of the progress of the tape wheel and of the message limit lamp signal is afforded at a single point of observation. It will be apparent that cam 225 should be so oriented with respect to cam 67 that roller 228 has reached the bottom of its descent on the sharp drop-off of the cam about the time the cam 67 permits contact 71 to reclose.

When the tape wheel 11 is operated at high speed pointer lever 226, unless disabled, would be vibrated near the clockwise limits of its movement due to inability to follow the contour of cam 225. Furthermore, there would be no point in permitting lever 226 to attempt to follow the cam because each revolution of the cam is completed in about one-half second. Accordingly, apparatus has been provided for immobilizing pointer lever 26 when shaft 12 is being driven at high speed. This device comprises a brake member 236 pivoted at 237 and having a vertically extending flange 238 which supports an inverted channel 239 of rubber or other suitable material having a relatively high coefficient of friction. A lifting pin 241 extends downwardly from brake member 236 and engages the free end of a lever arm 242 carried by a rocker shaft 243. Shaft 243 also has secured thereto a lever arm 244 which is pivotally connected to clutch shifting link 61.

With the apparatus in the condition shown in FIG. 1, namely, with the clutch mechanism in the neutral position, rocker shaft 243 is so disposed under the control of link 61 that the friction channel 239 carried by brake 236 is out of engagement with the under-surface of pointer lever 26 and spring 232 holds cam follower roller 228 in engagement with cam 225. When the combined control switching and clutch shifting shaft 51 is rocked in counter-clockwise direction, link 61 is moved downwardly and rocker shaft 243 is rocked in counter-clockwise direction as viewed from the right-hand end, thus permitting brake member 236 to move farther away from the under-surface of pointer lever 226. However, when shaft 51 is rocked in clockwise direction, link 67 is moved upwardly, shifting the clutch into the high speed driving condition, and also rocking shaft 243 in clockwise direction as viewed at the right-hand end thereof. Lever arm 242 moves lifting pin 241 upwardly and the pin rocks the flanged edge of brake member 236 upwardly to bring the inverted channel 239 into engagement with the lower surface of pointer lever 226. In the first revolution of cam 225, pointer lever 226 is rocked to extreme clockwise position, its lower surface sliding over friction channel 239 and due to the sharpness of the movement, the pointer lever may overtravel slightly, its cam follower roller 228 moving out of engagement with the periphery of cam 225. Friction channel 239 will retain pointer lever 226 in this position against the tendency of spring 232 to restore it as long as high speed operation of shaft 12 continues. Thus the pointer lever 226 will be relieved of the sharp high frequency impacts which cam 225 would otherwise impart to it, and a potential source of excessive wear and noise is eliminated.

Although a specific embodiment of the invention has been shown in the drawings and described in the foregoing specification, it will be understood that the invention is not limited to such specific embodiment but is capable of modification, reorganization, rearrangement and substitution of parts and elements without departing from the spirit of the invention and within the scope of the appended claims.

What is claimed is:

1. In a communication apparatus, a rotatable wheel, a band of signal storing medium carried by the periphery of said wheel, means for driving said wheel, means fixedly located in cooperative relation with said band of storing medium for impressing signals on said medium and for deriving signals from said medium, switching means for selectively causing said last-mentioned means to impress or derive signals, and means operable concurrently with said switching means for imparting to said wheel from said driving means either of two speeds related in a high ratio, typified by one hundred to one, for either condition of said signal impressing and deriving means.

2. In a communication apparatus, a rotatable wheel, a band of signal storing medium carried by the periphery of said wheel, means for driving said wheel, means fixedly located in cooperative relation with said band of storing medium for impressing signals on said medium and for deriving signals from said medium, switching means for selectively causing said last-mentioned means to impress or derive signals, and means operable concurrently with said switching means for imparting to said wheel from said driving means either of two speeds for either condition of said signal impressing and deriving means, one of said speeds having manifold relation to the other.

3. In a communication system, signal generating means, signal transmitting means, signal receiving means, signal reproducing means, a rotatable wheel, means for driving said wheel, a band of signal storing medium carried by the periphery of said wheel, means in cooperative relation with said band for impressing signals on said band and for deriving signals from said band, switching means operable for selectively associating (*a*) said signal generating means, (*b*) said signal reproducing means, (*c*) said signal transmitting means, (*d*) said signal receiving means with said signal impressing and deriving means, and means operably associated with said switching means for imparting from said driving means to said wheel a predetermined speed accompanying said selective associations (*a*) and (*b*) and for increasing said speed manyfold accompanying said selective associations (*c*) and (*d*).

4. In a signal transmitting device, a rotatable wheel, a signal storing band carried by the periphery of said wheel having message signals stored therein, means for driving said wheel, clutch means for connecting said wheel to said driving means for continuous rotation, means disposed in cooperative relation with said band for deriving signals therefrom, signal transmitting means, means for associating said signal deriving means with said transmitting means, means for conditioning said associating means to be operated, means controlled by said wheel for operating said associating means just before the beginning of said stored message signals is presented to said signal deriving means for the first time following the operation of said conditioning means, and means also controlled by said wheel for disabling said associating means at substantially the end of one revolution of said wheel.

5. In a signal transmitting device, a rotatable wheel, a signal storing band carried by the periphery of said wheel having message signals stored therein, means for driving said wheel, clutch means for connecting said wheel to said driving means for continuous rotation of said wheel, means disposed in cooperative relation with said band for deriving signals therefrom, signal transmitting means, and means for associating said signal deriving means with said transmitting means for one revolution of said wheel.

6. In a signal transmitting device, a rotatable wheel, a signal storing band carried by the periphery of said wheel having message signals stored therein, means for driving said wheel, clutch means for connecting said wheel to said driving means for continuous rotation of said wheel, means disposed in cooperative relation with said band for deriving signals therefrom, signal transmitting means, and means conditioned by manual control and operated under control of said wheel for associating said transmitting means with said signal deriving means for one revolution of said wheel beginning just in advance of the beginning of said message signals.

7. In a telegraph signal transmitter of the storage type, a magnetic recorder including a recording magnet and a magnetizable tape movable relative to said magnet, a source of alternating current having a frequency of low audibility, means for energizing said magnet from said source of current in accordance with telegraph signals, a source of alternating current having a frequency of relatively high audibility, means for causing said magnet energizing current to key said second source of alternating current, and means for reproducing said keyed second source of alternating current for monitoring said telegraph signals.

8. In a telegraph signal transmitter of the storage type, a magnetic recorder including a recording magnet and a magnetizable tape movable relative to said magnet, a source of alternating current having a frequency of low audibility, telegraph signaling contacts for impressing on said magnet trains of cycles of said alternating current according to telegraph signals, means for rectifying said trains of cycles to derive direct current impulses therefrom, a second source of alternating current having a frequency of high audibility, means controlled by said direct current impulses for keying said second source of alternating current to produce trains of cycles of said second source, and means for reproducing said trains of cycles of said second source audibly for monitoring said telegraph signals.

9. In a telegraph signal storage device, a pick-up magnet, a magnetizable tape movable relative to said magnet and having telegraph signals stored therein comprising trains of sound record at a frequency of low audibility, means controlled by said magnet for rectifying trains of alternating current generated therein by said sound record to derive direct current impulses therefrom, a source of alternating current having a frequency of high audibility, means controlled by said direct current impulses for keying said source of alternating current to produce trains of cycles of said source, and means for reproducing said last-mentioned trains of cycles audibly.

10. In a communication system, a magnetic recorder including a magnetizable tape and a magnet usable alternatively for recording signals on said tape and for deriving signals from said tape, a source of alternating current for energizing said magnet, means for keying said source according to message signals whereby to magnetize said tape according to said signals, means for driving said tape at low speed past said magnet during keying of said source, a transmitter, means for operatively associating said transmitter with said magnet, means for driving said tape at high speed whereby said magnet derives signals from said tape at high frequency and operates said transmitter, a receiver responsive to signals received from said transmitter, a source of alternating current having a frequency substantially the same as the frequency of the signals derived from said tape, a magnetic recorder associated with said receiver similar to the first-mentioned recorder, means for driving said recorder at a high speed substantially equal to the high speed of the first-mentioned recorder, means for energizing the magnet of the second-mentioned recorder from the second-mentioned source of alternating current according to said received signals, means for driving said recorder at low speed whereby to derive signals therefrom at low frequency, means for rectifying said derived signals to produce direct current impulses, a source of alternating current having a frequency intermediate the frequencies of the first-mentioned and second-mentioned sources of alternating current, means for causing the last-mentioned direct current impulses to key the last-mentioned source of alternating current, and means for reproducing said keyed last-mentioned source audibly.

11. In a signal storing and reproducing device, a magnetizable tape, a magnet usable alternatively for storing signals on said tape and for reproducing stored signals therefrom, an amplifier for amplifying signals reproduced from said tape, means for driving said tape at either of two widely different speeds whereby the frequency and voltage level of reproduced signals varies accordingly as the speed of said tape during signal reproduction differs from the speed of said tape during the storing of said signals, means for changing the tape driving speed, and switching means associated with said speed changing means for inversely changing the gain of said amplifier to compensate for said voltage level variation.

12. In a signal storing and reproducing device, a magnetizable tape, a magnet usable alternatively for storing signals on said tape and for reproducing stored signals therefrom, an amplifier for amplifying signals reproduced from said tape, means for driving said tape at either of two widely different speeds whereby the frequency and voltage level of reproduced signals varies accordingly as the speed of said tape during reproduction differs from the speed of said tape during the storing of said signals, means for changing the tape driving speeds, means for varying the voltage level of signals before introduction of said signals into said amplifier, and means associated with said speed changing means for controlling said voltage level varying means.

13. The method of recording signals magnetically which comprises, preparing a magnetizable medium to record signals by demagnetizing the tape by alternating current having a frequency which is high by comparison with the signal recording frequency and a wave-length which is small be comparison with the dimensions of the pole faces of the recording magnet, and recording signals comprising pulsating current in the audible range on said medium without bias.

14. In a telegraph system, a source of oscillatory current, means for keying said current according to telegraph signals, means including a magnetizable tape and a magnet energizable by said keyed oscillatory current for recording said signals and energizable by said tape for reproducing said signals, means for driving said tape at low speed during signal recording and at high speed during signal reproduction whereby the frequency of the reproduced oscillatory current is higher than the frequency of the keyed oscillatory current by the factor of increase in tape speed, means for transmitting said signals, means for receiving said signals, a source of oscillatory current hava frequency substantially equal to that of said reproduced oscillatory current, means for keying the last-mentioned source of oscillatory current according to said received signals, means including a magnetizable tape and a magnet energizable by the oscillatory current keyed by said received signals for recording said signals and energizable by said tape for reproducing said signals, means for driving the last-mentioned tape during signal recording at the speed of the first-mentioned tape during signal reproducing and during signal reproducing at the speed of said first-mentioned tape during signal recording whereby the frequency of the reproduced oscillatory current is substantially equal to the frequency of the first-mentioned source of oscillatory current, and means for rendering said reproduced oscillatory current audible to render said received signals intelligible.

15. In a communication system, means for generating message signals, a signal storing medium comprising a length of tape conformed to a substantially closed geometrical figure, means for storing signals generated by said generating means on said medium, means for driving said medium past said storing means, and means for indicating an interval of time during which the ends of said tape traverse said signal storing means.

16. In a communication apparatus, a signal storage medium, means for impressing signals on and deriving signals from said medium, means for driving said medium past said storing and deriving means at either of two materially different speeds, switching means for establishing electrical connections for said signal impressing and deriving means representing either of two signal impressing conditions and either of two signal deriving conditions and a neutral condition, speed changing means for changing said driving means from neutral condition to either of said two speeds, and means for coupling said speed changing means to said switching means, said coupling means including yieldable means for accommodating operation of said speed changing means concomitantly with said switching means only upon operation of said switching means out of or into neutral condition.

17. In a radio signal receiving and recording device, means for receiving trains of oscillatory current waves at radio frequency representing signals, means for rectifying said waves to derive a direct current pulse from each train of waves, means for amplifying said pulses, a magnetic recorder comprising a movable magnetizable metallic medium and an electromagnet associated therewith, means for generating oscillatory current at a frequency suitable for recording on said medium, means for causing said amplified pulses to key said current generating means, means for associating said electromagnet with said keying means to be energized by said keyed oscillatory current, and means associated with said keying means for reproducing audibly said keyed oscillatory current for monitoring during energization of said electromagnet.

18. In a signal storing device, a signal storing medium comprising a magnetizable tape, a magnet energizable in response to signals to be stored on said tape, a source of alternating current associable with said magnet having a frequency that is high with respect to the frequency of signals to be stored on said tape and a magnetization wavelength that is small with respect to the pole faces of said magnet for demagnetizing said tape, and means for energizing said magnet without bias in accordance with the signals to be stored in said demagnetized tape.

19. In a communication system, means for transmitting signals comprising a message restricted to a predetermined maximum transmission interval, means for receiving said message signals, a signal storing medium comprising a magnetizable tape conformed to a substantially closed geometrical figure, a magnet for magnetizing said tape in accordance with received message signals, means for driving said tape past said magnet at a speed such that the whole of said tape traverses said magnet once in said transmission interval, manually operable means for establishing continuous driving of said tape in anticipation of message signal reception, and means controlled by said receiving means for energizing said magnet without bias in accordance with said received signals whereby the signals stored in said tape by said magnet during said interval remain undisturbed by said magnet as said tape continues to be driven past said magnet after the end of said interval.

20. In a communication system, means for transmitting signals comprising a message restricted to a predetermined maximum transmission interval, means for receiving said message signals, a signal storing medium comprising a magnetizable tape conformed to a substantially closed geometrical figure, a magnet for magnetizing said tape in accordance with received signals, means for driving said tape past said magnet at a speed such that the whole of said tape traverses said magnet once in said transmission interval, a source of alternating current associable with said magnet having a frequency that is high with respect to the frequency of signals to be stored on said tape and a magnetization wavelength that is small with respect to the pole faces of said magnet for demagnetizing said tape in preparation for the storing of signals therein, manually operable means for establishing continuous driving of said tape in anticipation of message signal reception, and means controlled by said receiving means for energizing said magnet without bias in accordance with said received signals whereby the signals stored in said tape by said magnet during said interval remain undisturbed by said magnet as said tape continues to be driven past said magnet after the end of said interval.

References Cited in the file of this patent

UNITED STATES PATENTS

| | | |
|---|---|---|
| 1,358,053 | Bascom | Nov. 9, 1920 |
| 1,459,202 | Fuller | June 19, 1923 |
| 1,567,566 | Brackett | Dec. 29, 1925 |
| 1,724,057 | Weaver et al. | Aug. 13, 1929 |
| 1,813,908 | Bethenod | July 14, 1931 |
| 2,069,841 | Massonneau | Feb. 9, 1937 |
| 2,235,132 | Wooldridge | Mar. 18, 1941 |
| 2,238,259 | Hagen | Apr. 15, 1941 |
| 2,254,933 | Bryce | Sept. 2, 1941 |